U S007653664B2

(12) United States Patent
Chitre et al.

(10) Patent No.: US 7,653,664 B2
(45) Date of Patent: Jan. 26, 2010

(54) ANCHOR FOR DATABASE SYNCHRONIZATION EXCLUDING UNCOMMITTED TRANSACTION MODIFICATIONS

(75) Inventors: Sudarshan A. Chitre, Redmond, WA (US); Rafik Robeal, Redmond, WA (US); Shaoyu Zhou, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 11/592,588

(22) Filed: Nov. 3, 2006

(65) Prior Publication Data

US 2008/0109494 A1    May 8, 2008

(51) Int. Cl.
*G06F 12/00* (2006.01)
*G06F 17/30* (2006.01)
(52) U.S. Cl. .................... 707/201; 707/202; 709/213
(58) Field of Classification Search ............. 709/203, 709/248, 213; 707/10, 201, 204, 101, 202, 707/200, 102; 711/173; 714/19, 15, 16, 714/4
See application file for complete search history.

(56) References Cited

U.S. PATENT DOCUMENTS

| | | | | |
|---|---|---|---|---|
| 4,888,681 A | * | 12/1989 | Barnes et al. | 707/101 |
| 5,043,876 A | * | 8/1991 | Terry | 707/201 |
| 5,381,545 A | * | 1/1995 | Baker et al. | 714/19 |
| 5,504,900 A | * | 4/1996 | Raz | 707/10 |
| 5,613,060 A | * | 3/1997 | Britton et al. | 714/15 |
| 5,640,561 A | * | 6/1997 | Satoh et al. | 707/202 |
| 5,701,480 A | * | 12/1997 | Raz | 718/101 |
| 5,884,328 A | * | 3/1999 | Mosher, Jr. | 707/202 |
| 6,061,714 A | * | 5/2000 | Housel et al. | 709/203 |
| 6,163,856 A | * | 12/2000 | Dion et al. | 714/4 |
| 6,453,343 B1 | * | 9/2002 | Housel et al. | 709/213 |
| 6,779,057 B2 | * | 8/2004 | Masters et al. | 710/55 |
| 6,862,595 B1 | * | 3/2005 | Elko et al. | 707/10 |
| 2003/0061537 A1 | * | 3/2003 | Cha et al. | 714/16 |
| 2003/0208505 A1 | * | 11/2003 | Mullins et al. | 707/102 |
| 2004/0205263 A1 | * | 10/2004 | Sivaraman et al. | 710/21 |
| 2005/0015436 A1 | * | 1/2005 | Singh et al. | 709/203 |
| 2005/0125621 A1 | * | 6/2005 | Shah | 711/173 |
| 2005/0198084 A1 | * | 9/2005 | Kim | 707/204 |

(Continued)

FOREIGN PATENT DOCUMENTS

KR    10-2006-0065054 A    6/2006

OTHER PUBLICATIONS

International Search Report, PCT/US2007/077656, Jan. 4, 2008, pp. 1-10.

*Primary Examiner*—John E Breene
*Assistant Examiner*—Giovanna Colan

(57) ABSTRACT

Described is a technology in which an anchor value is determined, for example to synchronize a destination database or data store with modifications made to a source database. The new anchor value is determined in a manner that excludes modifications corresponding to any uncommitted transactions. The new anchor value may be based on a counter value or a date and time value stored with each modification. The new anchor value may be determined by comparing a first set of committed modifications that do not include uncommitted modifications against a second set of modifications that includes committed modifications and uncommitted modifications. Alternatively, the new anchor value may be determined from the earliest start date and time among the modifications that are part of any uncommitted transactions. The anchor may be used (e.g., via queries) to enumerate modifications for synchronization, and also for detecting conflicts between the source and destination databases.

10 Claims, 8 Drawing Sheets

U.S. PATENT DOCUMENTS

2005/0210073 A1* 9/2005 Oeda et al. .................. 707/200
2006/0074495 A1* 4/2006 Giacomello .................... 700/9
2007/0198518 A1* 8/2007 Luchangco et al. ............ 707/8

* cited by examiner

| Originator | Table Data | CV or DT |
|---|---|---|
| | | 18 |
| | | 4 |
| | | 50 |
| | | 5 |
| | | 52 |
| | | 15 |
| | | 14 |
| | | 35 |
| | | 39 |
| | | 46 |
| ⌇ | ⌇ | ⌇ |
| | | 11 |

ANCHOR FOR DATABASE SYNCHRONIZATION EXCLUDING UNCOMMITTED TRANSACTION MODIFICATIONS

BACKGROUND

When databases are distributed, synchronization needs to be performed so that each database applies the same modifications (or changes) that are made to each other database. Similarly, data stores may be synchronized with the modifications made to a database. In general, for efficiency synchronization is incremental from a previous synchronization point, also referred to as an anchor, whereby only modifications to a database from that point forward need to be communicated to the other database that is being synchronized.

One way in which the anchor can be used is to maintain a counter that increases with each modification, and store that counter in conjunction with the modification, e.g., in a counter column in the modified row. A similar technique for establishing an anchor is to store a date/time stamp (e.g., datetime) in conjunction with each modification. Synchronization thus proceeds by communicating any changes since the last anchor forward, and then updating the anchor to the new counter value or datetime value for the next synchronization.

A problem with this technique is that modifications to databases are part of transactions. Counters or datetimes are allocated to individual rows in the order in which the rows are modified, not in the order in which the transaction's modifications are committed. For example, if a transaction T has not committed at the time of synchronization, referred to as a change enumeration, any counters or datetimes corresponding to modifications that are part of that transaction T will not be enumerated when looking for changes, as typically change enumeration will only query committed data. However, the database counter or current time used as the anchor will have advanced.

As a result, the set of counters or datetimes seen at the change enumeration snapshot may not be contiguous, but the system will assume changes are contiguous up to the current anchor, with the next synchronization starting from that anchor. When changes are not enumerated, the two databases having a synchronization relationship may end up in a non-convergence state.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a destination database is synchronized with a source database to apply modifications made to the source database to the destination database, using a new anchor value to incrementally enumerate the modifications that were made to the source database. The new anchor value is determined in a manner that excludes any modification or modifications corresponding to an uncommitted transaction.

In one example implementation, the new anchor value may be based on a counter value stored with each modification, or may be based on a date and time value stored with each modification. The new anchor value may be determined by obtaining a first set of committed modifications that do not include uncommitted modifications, obtaining a second set of modifications that includes committed modifications and uncommitted modifications, and establishing the new anchor value based on a minimum counter or date and time value that exists in the second set but not in the first set. Alternatively, the new anchor value may be determined based on the earliest start date and time among the modifications that are part of any uncommitted transactions. The anchor may be used to enumerate modifications for synchronization, and also for detecting a conflict between the source and destination databases. Note that when deletes are synchronized, this calculation is done on the deleted rows as well; deleted rows are typically copied to a separate table (called tombstone table) by a delete trigger on the source table.

In one example implementation, a synchronization mechanism coupled to the source database and destination database computes the new anchor value based upon the lowest value that is used to track a modification that is part of an uncommitted transaction. The new anchor value may correspond to a counter value, or to date and time data that is that is stored in association with each modification.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 8 is an example representation of a table in which an originator column is present to help in conflict detection.

DETAILED DESCRIPTION

Various aspects of the technology described herein are generally directed towards finding an anchor that takes into consideration uncommitted transactions. This allows synchronization between two databases to occur in a manner that prevents a non-convergent state, yet without having to wait for all transactions to complete to perform incremental synchronization.

In one example aspect, date and time data stored with each modification is used as the datatype to determine where to synchronize from the previous anchor, which is in the form of a date and time value. The anchor, corresponding to a date/time value, is adjusted for any uncommitted transactions. In another example aspect, a counter is adjusted for any uncommitted transactions and used as the datatype to determine where to synchronize from the previous anchor that corresponds to a previous counter value. For example, the counter monotonically increases with each modification, and is stored with each modification. As can be readily appreciated, a monotonically increasing counter is only one example, and alternatively, the counter may decrease from a higher value, and/or need not monotonically change (e.g., the counter may change by a value other than one). Another example is that all modifications inside one transaction can share the same counter value.

As such, although the examples herein are described in the context of a counter or date and time stamp, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and/or database synchronization in general.

Figure 1:
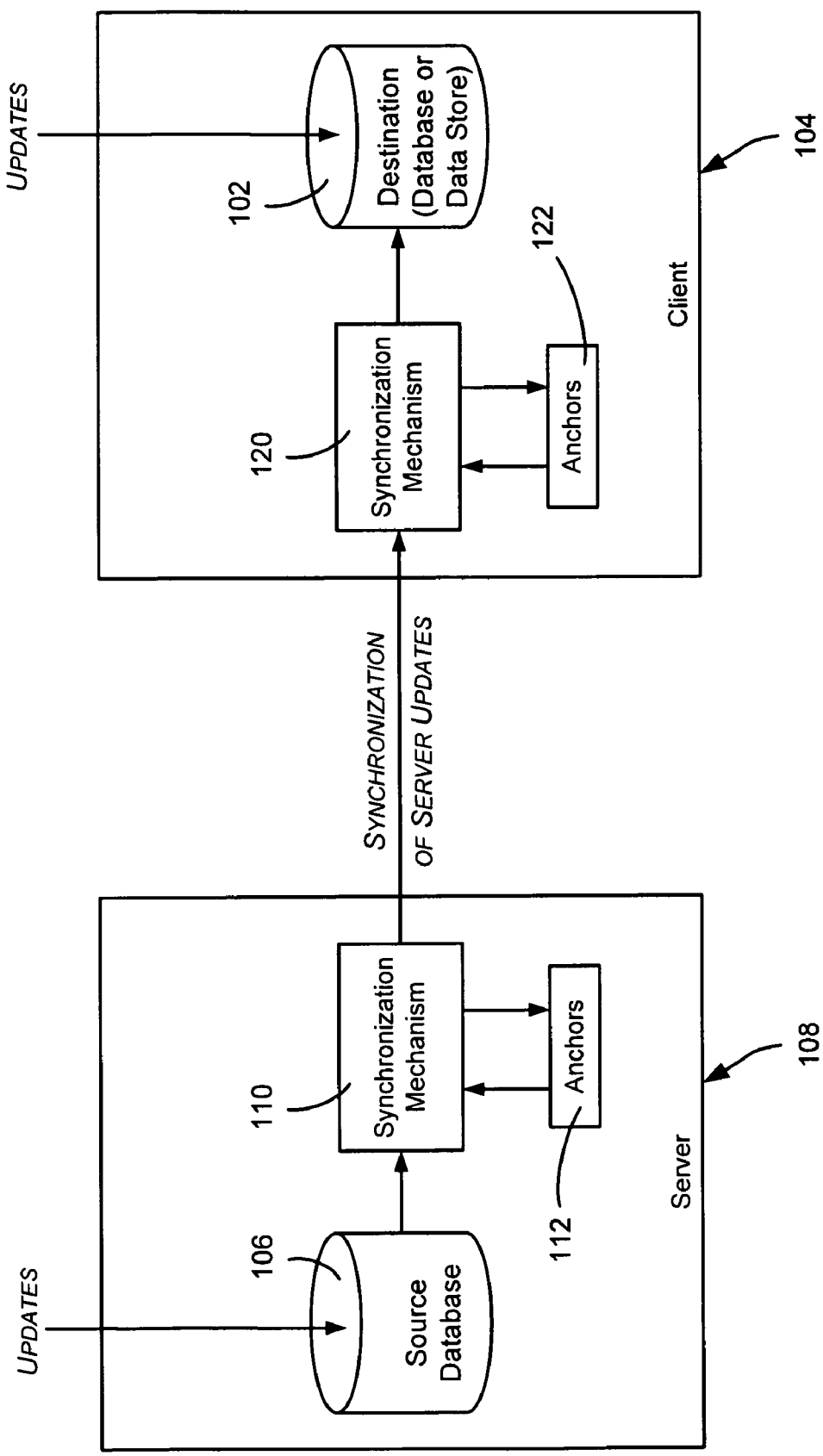
FIG. 1 shows an illustrative example of a general-purpose computing environment including a source database and destination database or data store, into which various aspects of the present invention may be incorporated.

FIG. 1 shows an example arrangement for synchronizing a destination database or data store 102 of a client 104 to account for the modifications made to a source database 106 of a server 108. Note that although in FIG. 1 one database 106 is shown as a source and the other a destination database or data store 102, it is understood that modifications from external users and the like may be received at the database 106, and also at the destination 102 if the destination comprises an externally updatable database, in which event synchronization thus may take place in both directions. Also, while only two databases (or one database and one data store) are shown in FIG. 1, it is understood that any number of databases and/or data stores may be present in a given system, and, for example, each may synchronize with each other pair-wise or in another established manner.

As described below, a synchronization mechanism 110 at the server uses anchors 112 to track which modifications have been communicated to the client 104. To this end, the synchronization mechanism 110 maintains a last (or previous) anchor, and determines a new anchor comprising a synchronization point (e.g., a date/time or count value) to which it is safe to incrementally synchronize the destination database or data store 102, that is, without incorrect enumeration due to non-committed transactions. As also described below, the anchors 112 may be based upon a counter, or may be based upon date and time data, referred to herein as a datetime value (or equivalent). A counterpart synchronization mechanism 120 and anchors 122 are shown at the client 104 for completeness and to reiterate that synchronization may occur in the opposite direction if the client 104 comprises a user-updatable database. Also, the synchronization mechanism 120 may be used to apply the modifications to the destination database or data store 102.

Figure 2:
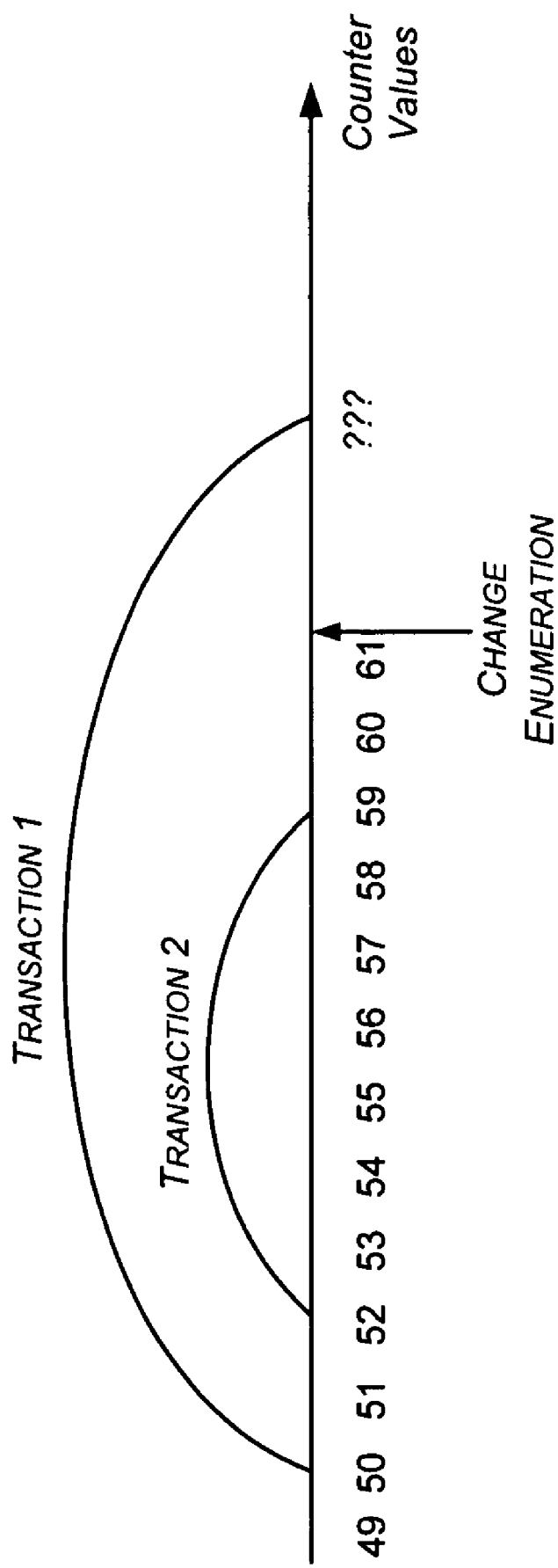
FIG. 2 is an example representation of modifications to a database that are part of transactions, in which a counter is used to track each modification.

FIG. 2 shows an example representation of a counter that is incremented to track each modification to a database, including the modifications of one of two transactions, namely Transaction 1 and Transaction 2. As can be seen, Transaction 1 starts making modifications at a count of 50, with Transaction 2 making its modifications at counts 52-59. It should be noted that Transaction 1 can make modifications in between the modifications of Transaction 2, however for purposes of simplicity in FIG. 2, Transaction 2 is shown as having sequential modifications.

At some time after Transaction 2 commits but before Transaction 1 commits, shown in FIG. 2 as just after the change numbered 61, a change enumeration is performed. As described below, this is essentially a snapshot of the database state, at least following the last incremental synchronization, where, for example, a snapshot can only see the changes made by transactions that have committed. In other systems, the snapshot does not see modifications 50 and 51, or modifications 60 and 61, because they are part of non-committed Transaction 1, which may, for example, never commit whereby any of its uncommitted changes are rolled back.

Figure 3:
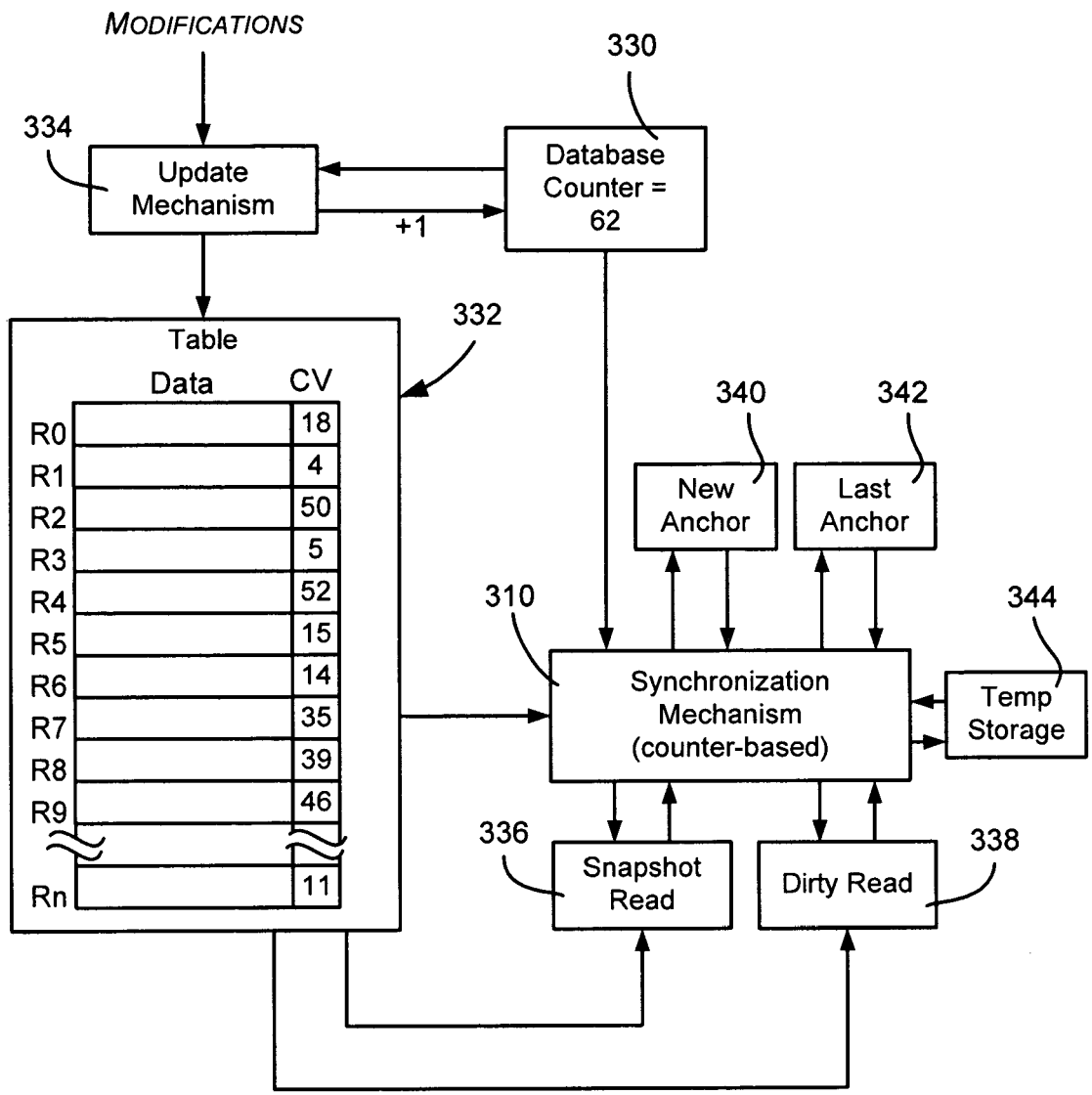
FIG. 3 is an example block diagram representing components that determine a new anchor value based on a counter value, in which the new anchor value is computed based on modifications prior to the modifications made in an uncommitted transactions.

FIG. 3 exemplifies a problem with such the other systems and a solution thereto, in which a prior synchronization mechanism (not shown) simply used the last value of the database counter 330, which in this example is the value 62. Essentially, as modifications to the database table 332 are made, the changed row's count value (CV) is assigned the current count value by an update mechanism 334, and the count increased in the counter 330. For transactions, the count is increased in the counter 330, but the count value in the CV column is not visible to a snapshot read mechanism 336 until the transaction is committed. Thus, for example, row 5 (R5)'s data may be about to be changed at count 61 as part of a transaction, but the table's data remains unchanged, and the count value remains at 15, until that transaction is committed; however, the database counter is increased to 62 for the next change. As a result, the changes marked with a counter value below 62 by the uncommitted transactions are not synchronized to the destination. Because the anchor is then advanced to 62, these changes are also not synchronized in subsequent synchronization sessions, whereby these changes are lost in the process.

Thus, in the example of FIG. 2, a problem would exist in that updates 50, 51, 60 and 61 would not be seen, but prior synchronization mechanisms considered the new anchor to be 62, for example, whereby the next incremental synchronizations would begin at 62, even though updates 50, 51, 60 and 61 would never have been made at the destination database, nor will they be made after Transaction 1 commits if 62 is used as the anchor for subsequent synchronization sessions.

In contrast to prior systems, a synchronization mechanism 310 (counter-based) of the technology described herein takes account of uncommitted transactions in determining the new anchor. In the example of FIG. 2, the new anchor 340's value is 49, not 61, because as described below, Transaction 1's non-committed state is accounted for by the synchronization mechanism 310 in determining the new anchor value. Note that it is possible that no differences exist because no transaction is uncommitted, in which event the synchronization mechanism 310 will use the database counter 330 (minus one since the increment was for the next update which has not occurred) as the anchor point.

To this end, in a counter-based system, the synchronization mechanism 310 utilizes the difference between a snapshot read 336 (which sees only committed changes) and a dirty read 338 (also referred to as read with nolock, which sees both committed and uncommitted changes) to figure out the minimum counter value that marks an uncommitted change. More particularly, in one example implementation, when changes are enumerated for synchronization, there may be other transactions proceeding in the system. It is often desirable for the results returned by change enumeration to be consistent with each other, since it is generally desirable (and often required) that change enumeration not block other operations. For these reasons, change enumeration is often run in snapshot isolation transactions.

Under the snapshot isolation level, the synchronization mechanism retrieves the committed counter values in a snapshot read 336. Then the synchronization mechanism switches to a dirty read 338 (i.e., read uncommitted isolation level) to get both the committed and uncommitted counter values. From the difference between the two reads, the synchronization mechanism 310 figures out the minimum uncommitted counter value.

Figure 4:
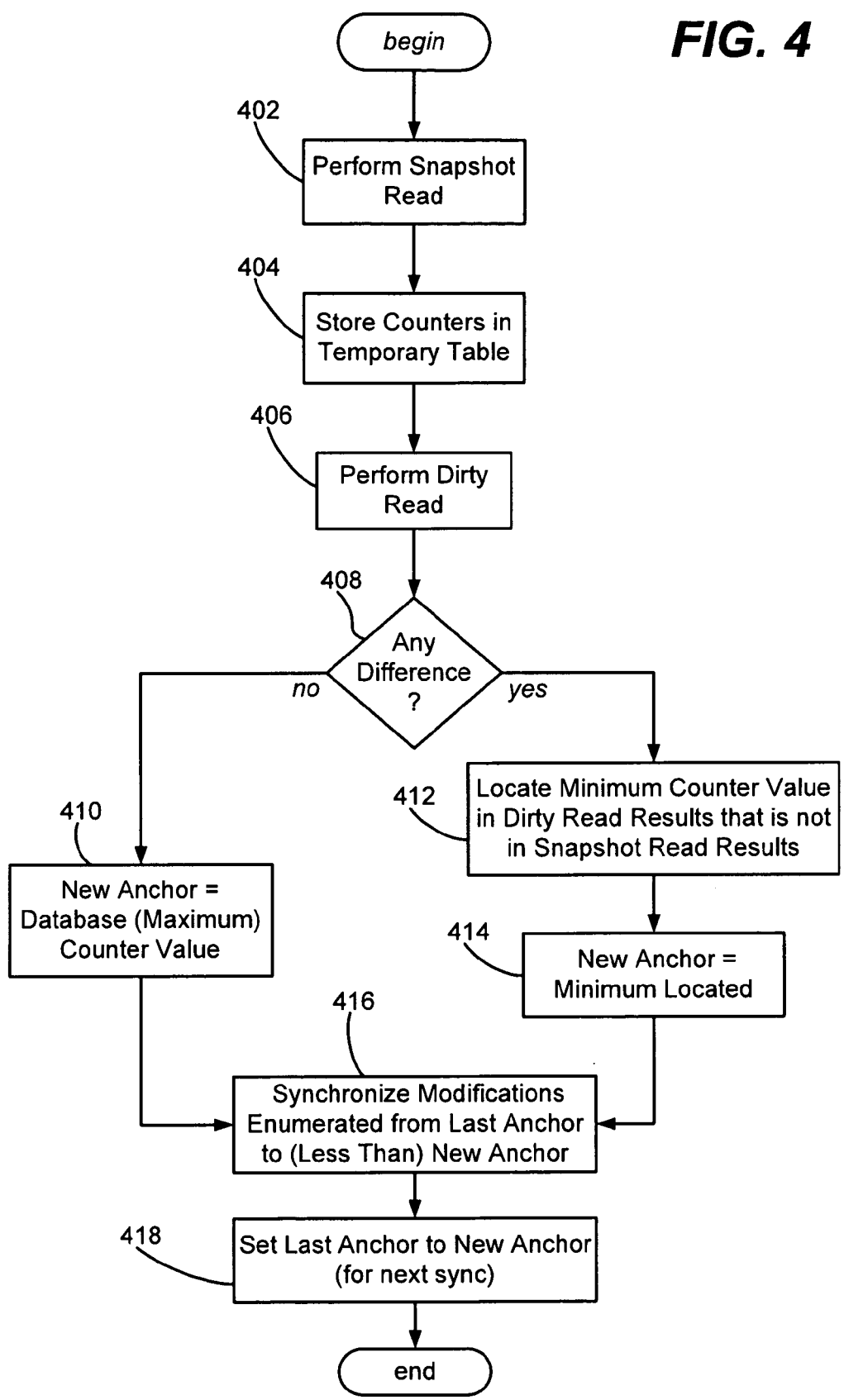
FIG. 4 is a flow diagram representing example steps taken to compute a new anchor while accounting for any uncommitted transactions.

FIG. 4 is a flow diagram showing example logic for determining the new anchor 340 when transactions are present in a counter-based modification tracking system. At step 402, a snapshot read is taken of the table 332, at least from the point of the last anchor 342. For example, any row with a count greater than the last anchor 342's value (e.g., a count value of 30) up to the database counter (e.g., 62) are read as potential updates. At step 404, the count values corresponding to these updates are temporarily stored in a temporary storage 344 (FIG. 3).

Step 406 represents performing a dirty read, which contains both the committed and uncommitted changes and their corresponding count values. Step 408 compares the values. If there is no difference, then there are no uncommitted transactions, and the maximum count value is used as the anchor, as represented by step 410.

In the event that a difference exists, then the anchor is set to one less than the smallest count value that is in the dirty read results but not in the snapshot read results, as represented by steps 412 and 414. Thus, in the example of FIG. 2, the value of the new anchor 340 is set at 49, because the smallest value in the dirty read results not in the snapshot read results is 50, because of the modifications of uncommitted Transaction 1. Incremental synchronization can then safely take place from that last anchor 342's value (e.g., 30) to the new anchor 340's value, that is, modifications 31 to 49, as represented via step 416. The new anchor value is then stored as the last anchor (for the next synchronization) as represented via step 418.

Figure 5:
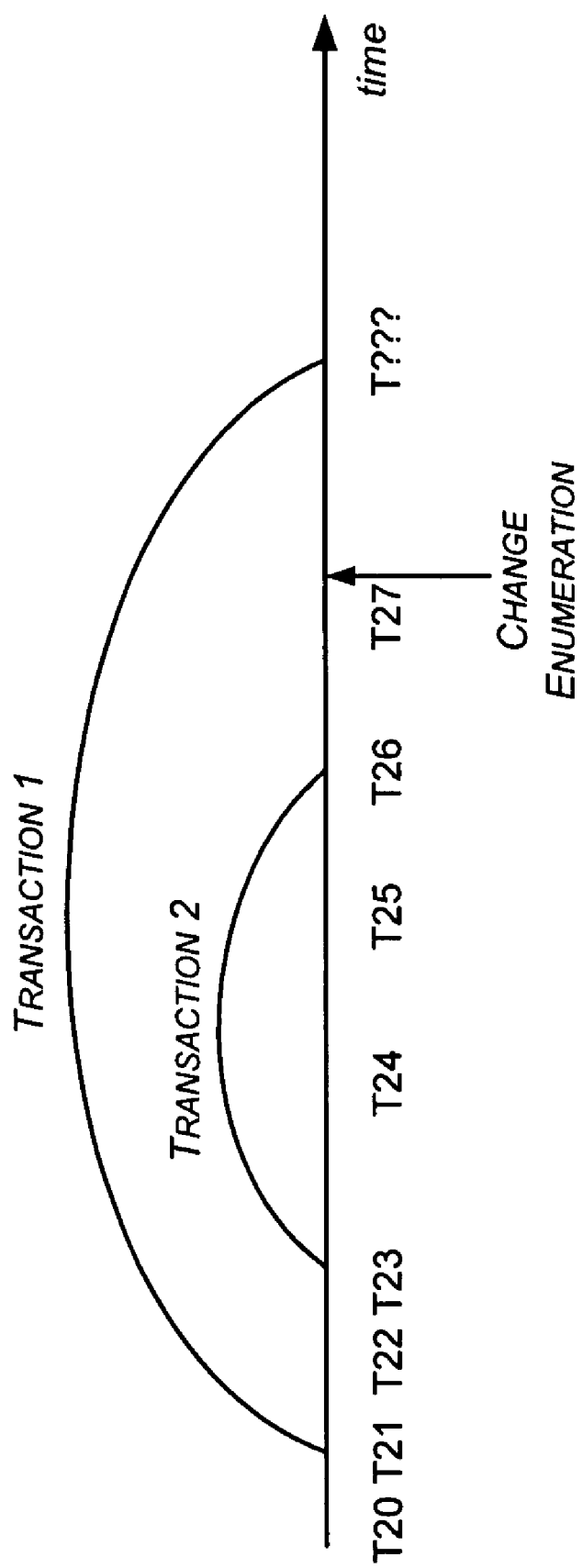
FIG. 5 is an example representation of modifications to a database that are part of transactions, in which date and time data is used to track each modification.
Figure 6:
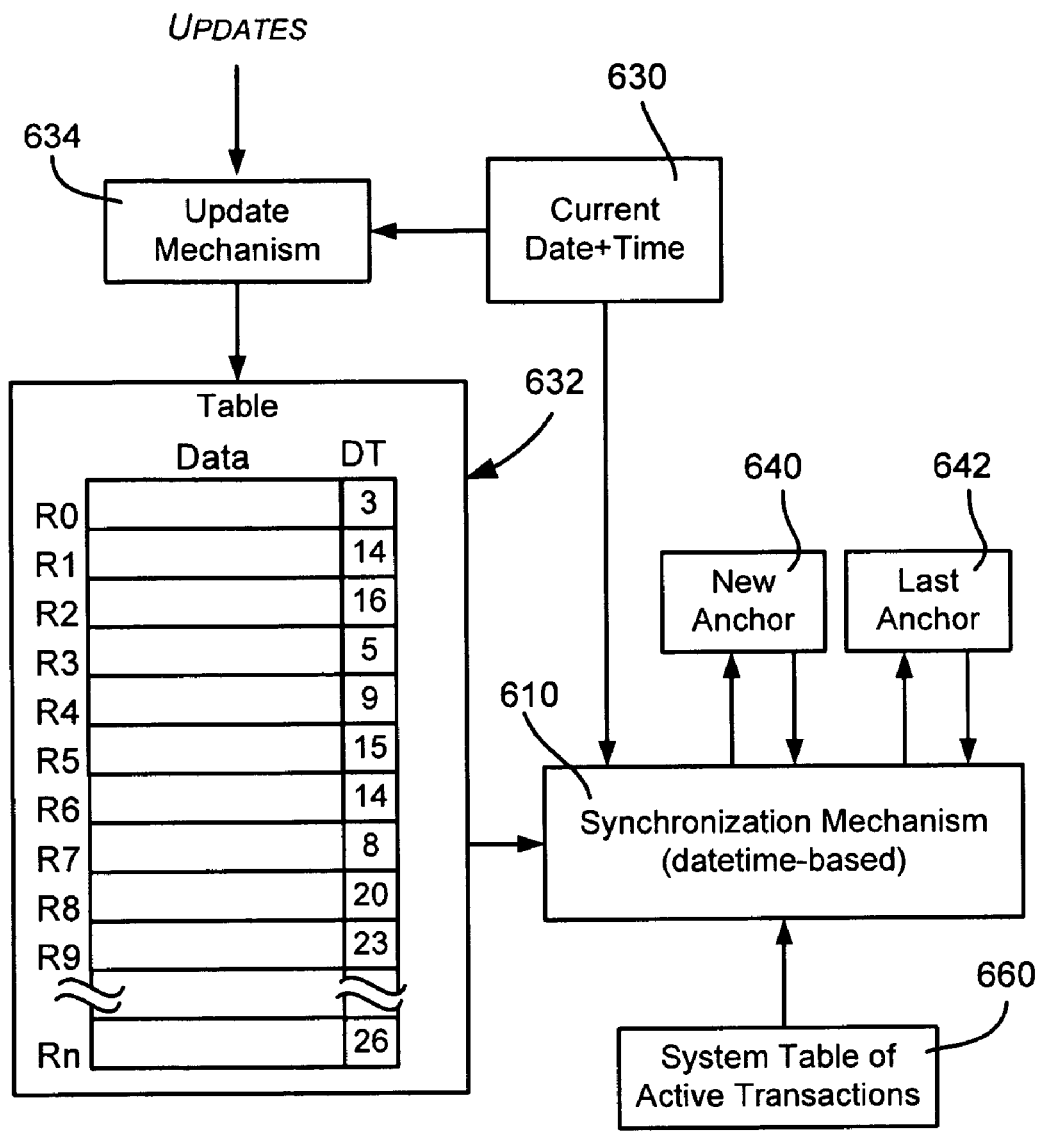
FIG. 6 is an example block diagram representing components that determine a new anchor value based on a date and time data, in which the new anchor value is computed to enumerate modifications prior to the modifications made in uncommitted transactions.
Figure 7:
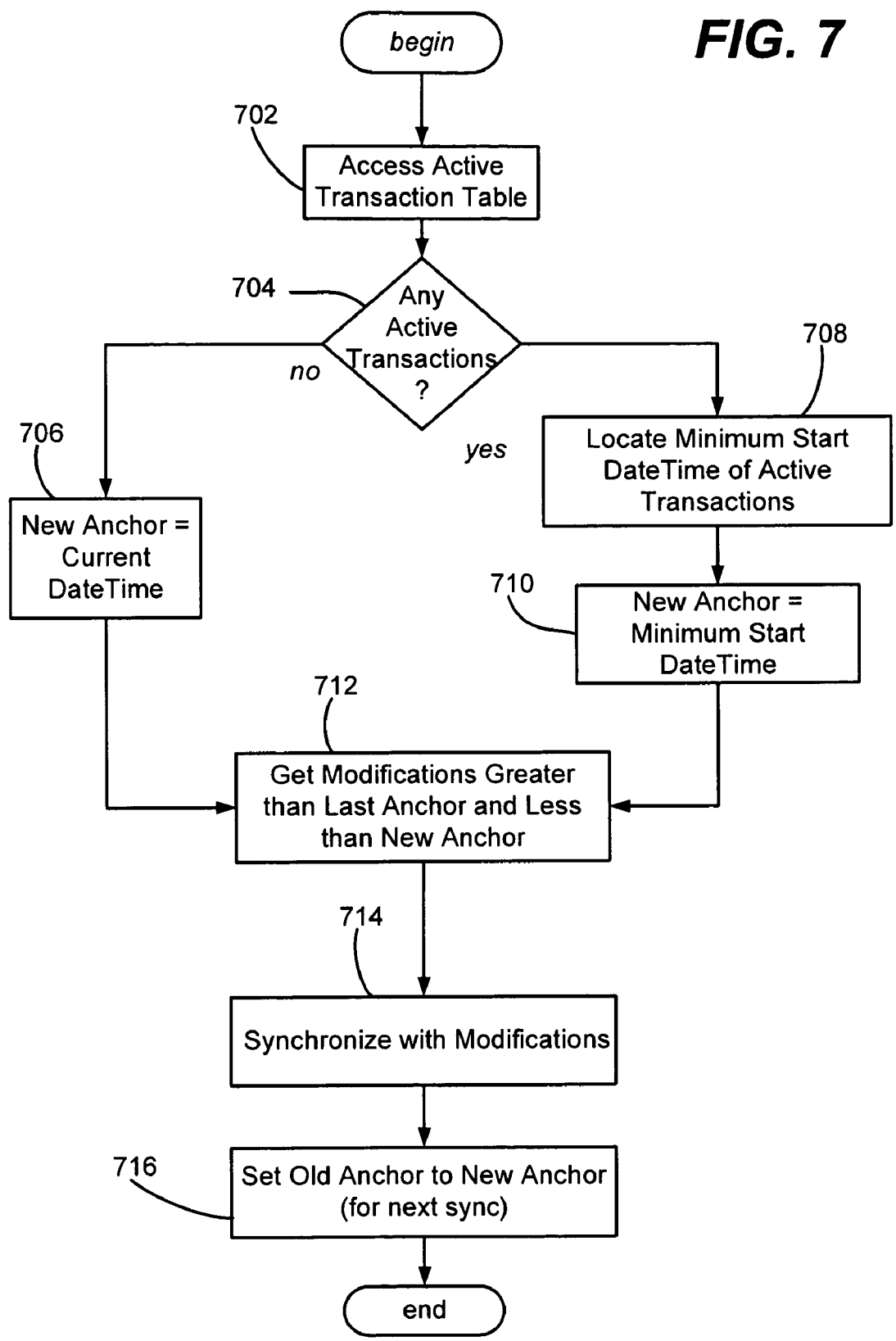
FIG. 7 is a flow diagram representing example steps taken to compute a new anchor while accounting for any uncommitted transactions.

FIGS. 5-7 are representations of a similar set of components and operations, in which the anchor type is a date and time-based anchor (rather than counter-based), referred to as a datetime anchor. In FIGS. 5 and 6, modifications are stamped with datetime values (DT), represented in the FIG. 5 as times T20-T27, but in actuality a date and time stamp corresponding to the time of the modification. It should be noted that a snapshot versus dirty read comparison process similar to that described above with reference to FIGS. 2-4 may be likewise used with datetime-based systems. However, the example in FIGS. 5-7 leverages a system table 660 that exists in at least some datetime-based databases, namely a system table 660 (FIG. 6) that tracks active transactions, including the starting datetime of those active transactions.

From the table 660 of active transactions, the datetime-based synchronization mechanism 610 figures out the earliest start time of the uncommitted transactions. This minimum uncommitted transaction start time is then be used as anchor, after some additional processing described below. Note that it is possible that no differences exist because no transaction is uncommitted, in which event the synchronization mechanism 310 will use the current datetime 630 as the anchor point.

In the example of FIG. 5, although the current time at the time of change enumeration is shortly after the modification made at a time value T27, the new anchor 640's value is T21, because as described below, Transaction 1's non-committed state is accounted for by the synchronization mechanism 610 in determining the new anchor value. To this end, the synchronization mechanism 610 recognizes from the system table 660 that Transaction 1 has not committed, and thus only datetime stamps before time T21 are certain to be contiguous. Note that there is no need to subtract from the current time, as the query to locate the modifications can be to return any modification greater than the last anchor time and less than the new anchor time.

FIG. 7 is a flow diagram showing example logic for determining the new anchor 640 when transactions are present in a datetime-based modification tracking system with a system table 660 of active transactions. At step 702, the system table 660 is accessed. If there are no uncommitted transactions as determined at step 74, then the new anchor may be set to the current datetime, as represented by step 706.

In the event that at least one transaction is active, then the anchor is set to the minimum starting datetime of the transaction or transactions, as represented by steps 708 and 710. Thus, in the example of FIG. 5, the value of the new anchor 640 is set to the datetime value corresponding to T21, because this is the minimum datetime value in the system table 660, corresponding to the start of uncommitted Transaction 1. Incremental synchronization can then safely take place from that last anchor 642's value (e.g., some earlier time such as corresponding to T14) to anything less than the new anchor 640's value, that is, modifications from T14 to T21 (non-inclusive), as represented via steps 712 and 714. The new anchor value is then stored as the last anchor (for the next synchronization) as represented via step 716.

For efficiency, it can be readily appreciated that modifications known to be committed can be included in the synchronization process. For example, returning to FIG. 2, in addition to modifications 30-49 being known as safe to synchronize, it is also known that modifications 52-59 are safe to synchronize, because they are committed before the change enumeration. This is known from the differences in the snapshot read and the dirty read. Thus, a synchronization mechanism may synchronize modifications 30-49 and 52-59 in this example, however the new anchor needs to remain at 49, with the systems tracking which modifications were synchronized between the current counter value (of 61) and the new anchor value (of 49).

As can be readily appreciated, a combination of system table reads and snapshot versus dirty read comparison techniques may be employed. For example, system table access is highly efficient, as no snapshot or dirty read queries on the table data are necessary, and thus can be performed relatively frequently. However, it is possible that a long-running transaction may be ongoing, thereby keeping the anchor from advancing beyond that transaction's starting time. In such an event, the snapshot versus dirty read comparison process may be used to locate committed updates that exist after that transaction's starting time.

In addition to finding a new anchor that accounts for transactions for the purposes of change enumeration as described above, using the simple form of anchors such as counter or datetime, the systems are able to detect conflicts, e.g., at the SQL (database query language) layer, with the help of storing information such as the originator of changes. As represented in FIG. 8, to support conflict detection utilizing a counter CV or datetime DT column, an Originator column may be added to the table 832 to stores the information of who has made the change. Together with the change tracking columns, the system is able to detect conflicts, by using the counter or datetime value to note a change that happened to destination row that was also changed at the source (and is thus being synchronized) in between the current and previous synchronization operations. For example, if the synchronization process wants to update a row at the destination, but the counter already in that row is greater than the anchor due to an external modification previously and separately received at that destination, a conflict is known to exist by the anchor value being exceeded. Logging, flagging and other conflict resolution techniques may then be applied.

The various functionality provided herein may be exposed as queries to utilize counter/datetime type columns to enumerate incremental changes using simple anchors, and to apply changes and detect conflicts. For example, after the minimum uncommitted counter or transaction start time is obtained, the queries may be used to perform change enumeration. For example, as described above, finding the minimum counter value or datetime value assigned to uncommitted transactions, along with some minor processing, may allow this value to be used as the anchor, e.g., the minimum uncommitted counter or datetime value may be used as the ceiling of a range for the current change enumeration session. Changes with a counter or datetime value greater than the minimum uncommitted counter or datetime value will be enumerated in the next change enumeration session.

To summarize, change enumeration queries may use range enumeration to enumerate changes between two baselines, namely the previous anchor and the new anchor. Depending on the change tracking columns supplied, the system may distinguish inserts, updates and deletes from among the enumerated changes. Further, conflict detection is also facilitated, possibly by storing information such as the originator of changes. Performing change applications and conflict detection (e.g., at the SQL layer) enables efficient processing by reducing the number of roundtrips to/from the database server.

The following table provides an example list of queries using simple anchors such as based on counter and datetime:

| | |
|---|---|
| Incrementally enumerate inserts | Utilizes counter or datetime type to track creations and enumerate inserts using range enumeration techniques. |
| Incrementally enumerate updates | The query utilizes counter and datetime type to track updates and enumerate updates using above-described range enumeration techniques. |
| Incrementally enumerate deletes | The query utilizes counter and datetime type to track deletes and enumerate deletes using above-described range enumeration techniques. |
| Apply inserts | Applies incoming inserts and utilizes counter or datetime type to record the version of the changes, together with an originator column to track the originator of the changes. |
| Apply updates with conflict detection | Applies incoming updates and utilizes counter or datetime type to record the version of the updates, together with an originator column to track the originator of the updates. The previous values of the tracking columns along with the originator column are used to restrict the scope of the change application to those rows that have not been concurrently changed. The row count impacted by the update statement is used to detect conflicts. |
| Apply deletes with conflict detection | Applies incoming deletes and utilizes counter or datetime type to record the versions of the deletes, together with an originator column to track the originator of the deletes. The previous values of the tracking columns along with the originator column are used to restrict the scope of the change application to those rows that have not been concurrently changed. The row count impacted by the delete statement is used to detect conflicts. |

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment in which a destination database or data store (102) is synchronized with a source database (106) to apply modifications made to the source database to the destination database or data store, a method comprising:

determining (414, 710) a new anchor value, including determining an anchor value that excludes any modification or modifications corresponding to an uncommitted transaction, the new anchor value based on a datatype value comprising an increasing counter value (330) or a date and time value (630) stored with each modification;

wherein determining the new anchor value comprises, obtaining (402) a first set of committed modifications that do not include uncommitted modifications, obtaining (406) a second set of modifications that includes committed modifications and uncommitted modifications, and establishing (412) the new anchor value based on a minimum value that exists in the second set but not in the first set;

wherein determining the new anchor value comprises, accessing (702) data corresponding to one or more active transactions, in which the data includes a start date and time associated with each active transaction, and establishing (708, 710) the new anchor value based on a minimum start date and time; and using (416, 712) the new anchor value to enumerate modifications that were made to the source database.

2. The method of claim 1 further comprising, synchronizing (416, 714) the destination database or data store to the source database, including synchronizing a range of modifications based on the new anchor value and a last anchor value.

3. The method of claim 2 further comprising, setting (418, 716) the last anchor value to the new anchor value after synchronizing.

4. The method of claim 2 further comprising, synchronizing at least one other modification outside the range that does not include any modification detected as part of an uncommitted transaction.

5. The method of claim 1 wherein the destination comprises an updateable database (332), and further comprising, detecting a conflict between the source database and destination database based on the new anchor value.

6. The method of claim 1 further comprising providing at least one query of a set of possible queries that use the new anchor value, the set of possible queries comprising: incrementally enumerate inserts, incrementally enumerate updates, incrementally enumerate deletes, apply inserts, apply updates with conflict detection, or apply deletes with conflict detection.

7. In a computing environment, a system comprising:
- a source database (106) of a server (108) that receives modifications and stores a date and time stamp in conjunction with each modification;
- a destination database or data store (102) that is synchronized with the modifications received at the source database;
- a synchronization mechanism (110) coupled to the source database and destination database or data store that computes a new anchor value (340, 640) for synchronizing the destination database or data store with a range of modifications, the new anchor value based upon the earliest date and time stamp that is used to track a modification that is part of an uncommitted transaction;
- wherein the synchronization mechanism (310) computes the new anchor value by comparing a first set of committed modifications (336) that do not include uncommitted modifications against a second set of modifications (338) that includes committed modifications and uncommitted modifications; and
- wherein the synchronization mechanism computes the new anchor value by determining a minimum start date and time value from among start date and time values associated with active transactions (660).

8. A method, comprising:
- evaluating (412) tracking data associated with at least one modification made to a source database that corresponds to an uncommitted transaction, the tracking data comprising a counter to track each modification, wherein the tracking data includes table data in the source database, and wherein evaluating the tracking data includes comparing (408) a first set of committed modifications that do not include uncommitted modifications against a second set of modifications that includes committed modifications;
- determining (414) a new anchor value for the source database based on the tracking data, wherein determining the new anchor value comprises selecting (414) from the tracking data a minimum value that exists in the second set but not in the first set; and
- using (416) the new anchor value to enumerate modifications that were made to the source database with respect to a previous anchor value.

9. The method of claim 8 further comprising, synchronizing (416, 714) a destination database or data store with a range of modifications based on the new anchor value and the previous anchor value.

10. The method of claim 8 further comprising, detecting a conflict between the source database and a destination database based on the new anchor value.

* * * * *